United States Patent
Jung et al.

(10) Patent No.: US 10,034,214 B2
(45) Date of Patent: Jul. 24, 2018

(54) TRAFFIC STEERING METHOD IN WIRELESS COMMUNICATION SYSTEM AND DEVICE SUPPORTING SAME

(71) Applicant: LG Electronics Inc., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 15/035,543

(22) PCT Filed: Nov. 12, 2014

(86) PCT No.: PCT/KR2014/010873
§ 371 (c)(1),
(2) Date: May 10, 2016

(87) PCT Pub. No.: WO2015/072752
PCT Pub. Date: May 21, 2015

(65) Prior Publication Data
US 2016/0295483 A1 Oct. 6, 2016

Related U.S. Application Data

(60) Provisional application No. 61/903,270, filed on Nov. 12, 2013.

(51) Int. Cl.
*H04W 36/22* (2009.01)
*H04W 28/08* (2009.01)
(Continued)

(52) U.S. Cl.
CPC ............ *H04W 36/22* (2013.01); *H04W 28/08* (2013.01); *H04W 36/0088* (2013.01); *H04W 88/02* (2013.01)

(58) Field of Classification Search
None
See application file for complete search history.

(56) References Cited

U.S. PATENT DOCUMENTS

2004/0185853 A1* 9/2004 Kim .................. H04W 36/0083
455/438
2012/0020204 A1* 1/2012 Morera ................. H04W 48/18
370/217
(Continued)

FOREIGN PATENT DOCUMENTS

WO 2012064067 5/2012
WO 2012149954 11/2012

OTHER PUBLICATIONS

Vodafone, et al., "3GPP Specific policies for WLANSP and scope of WLANSP policies of WLAN network quality," S2-133207, SA WG2 Meeting #99, Xiamen, China, Sep. 23-27, 2013, see pp. 1-3.
(Continued)

*Primary Examiner* — Noel R Beharry
*Assistant Examiner* — Ruihua Zhang
(74) *Attorney, Agent, or Firm* — Dentons US LLP

(57) ABSTRACT

Provided are a traffic steering method performed by a user equipment (UE) and the user equipment using the method. The method receives traffic steering information from a first network and moves traffic from the first network to the second network on the basis of the traffic steering information, only when the traffic steering information satisfies a specific condition, wherein the specific condition is not separated from the first network, even if traffic indicated by the traffic steering information is moved to the second network.

7 Claims, 15 Drawing Sheets

(51) Int. Cl.
*H04W 36/00* (2009.01)
*H04W 88/02* (2009.01)

(56) References Cited

U.S. PATENT DOCUMENTS

| | | | |
|---|---|---|---|
| 2013/0308445 A1* | 11/2013 | Xiang | H04W 28/0231 370/230 |
| 2015/0319662 A1* | 11/2015 | Enomoto | H04W 36/14 370/338 |
| 2016/0337903 A1* | 11/2016 | Cheng | H04W 28/12 |
| 2017/0265128 A1* | 9/2017 | Nagasaka | H04W 48/18 |

OTHER PUBLICATIONS

Alcatel-Lucent, et al., "ANDSF rules: WLAN Selection for camping vs. Traffic Steering," S2-131750, SA WG2 Meeting #S2-97, Busan, South Korea, May 27-31, 2013, see pp. 1-5.

* cited by examiner

TRAFFIC STEERING METHOD IN WIRELESS COMMUNICATION SYSTEM AND DEVICE SUPPORTING SAME

This application is a 35 USC § 371 National Stage entry of International Application No. PCT/KR2014/010873 filed Nov. 12, 2014, and claims priority to U.S. Provisional Application No. 61/903,270 filed Nov. 12, 2013, all of which are hereby incorporated by reference in their entireties as if fully set forth herein.

BACKGROUND OF THE INVENTION

Field of the Invention

The present invention relates to wireless communication, and more particularly, to a traffic steering method in a wireless communication system and a device supporting the same.

Related Art

3rd Generation Partnership Project (3GPP) long term evolution (LTE) which is enhancement of Universal Mobile Telecommunications System (UMTS) is introduced as 3GPP release 8. The 3GPP LTE uses orthogonal frequency division multiple access (OFDMA) in a downlink and uses Single Carrier-frequency division multiple access (SC-FDMA) in an uplink. Multiple input multiple output (MIMO) having a maximum of 4 antennas is adopted. In recent years, 3GPP LTE-Advanced (A) which is evolution of the 3GPP LTE has been discussed.

A wireless communication system can support providing a service through a plurality of access networks to a terminal. For example, the terminal can receive the service from a 3GPP access network which is a mobile wireless communication system and further, receive the service from non-3GPP access networks such as Worldwide Interoperability for Microwave Access (WiMAX), Wireless Local Area Network (WLAN), and the like.

The terminal can generally receive the service by establishing a connection with the 3GPP access network. Meanwhile, when traffic overload occurs in the 3GPP access network, processing traffic which the terminal intends to process through another access network, that is, the non-3GPP access network can improve overall efficiency of the network. Variably processing the traffic through the 3GPP access network and/or the non-3GPP access network is referred to as traffic steering.

A policy for interlocking the 3GPP access network and the non-3GPP access network such as Access Network Discovery and Selection Functions (ANDSF) can be configured in the terminal for the traffic steering and the policy is managed separately from an interlocking policy configured by the network.

Meanwhile, during the traffic steering, a specific access network can command or instruct the terminal to move the traffic to another access network. In this case, the specific access network may not accurately know the traffic of the terminal. When the terminal moves all traffic to be processed by the specific access network to another access network according to the command or instruction, the terminal can be separated from the specific access network. Then, there is a problem in that the service which needs to be provided by the specific access network may be interrupted/stopped.

SUMMARY OF THE INVENTION

The present invention provides a traffic steering method in a wireless communication system and a device supporting the same.

In an aspect, a traffic steering method performed by a user equipment (UE) in a wireless communication system is provided, the method comprises receiving traffic steering information from a first network and moving traffic from the first network to the second network on the basis of the traffic steering information, only when the traffic steering information satisfies a specific condition, wherein the specific condition is not separated from the first network, even if traffic indicated by the traffic steering information is moved to the second network.

When the traffic steering information does not satisfy the specific condition, the traffic may be not moved from the first network to the second network.

When the traffic steering information does not satisfy the specific condition, information for announcing rejection of the movement of the traffic to the second network may be transmitted to the first network.

The information for announcing the rejection of the movement of the traffic to the second network may include an indicator announcing that the UE is separated from the first network when moving the traffic to the second network by the traffic steering information.

When the traffic indicated by the traffic steering information is moved to the second network, in the case where there is no traffic which remains in the first network or there is no traffic transmission path, the terminal may be separated from the first network.

The traffic steering information may include an identity (ID) of a radio bearer to be moved from the first network to the second network.

When the radio bearer indicated by the traffic steering information is moved to the second network, in the case where there is no radio bearer which remains in the first network, the traffic steering information may be disregarded.

Measurement control information is received from the first network, the second network is measured based on the measurement control information, and the measurement result may be transmitted to the first network.

The traffic steering information may be generated based on the measurement result.

In another aspect, a user equipment (UE) which operates in a wireless communication system is provided. the UE comprises a radio frequency (RF) unit transmitting and receiving a radio signal and a process which operates in functional connection with the RF unit, wherein the processor configured to receive traffic steering information from a first network, and move traffic from the first network to the second network on the basis of the traffic steering information, only when the traffic steering information satisfies a specific condition, and wherein the specific condition is not separated from the first network, even if traffic indicated by the traffic steering information is moved to the second network.

In a traffic steering method according to an embodiment of the present invention, when a terminal that receives a command/an instruction for traffic steering from an access network performs the traffic steering, the terminals first considers whether the terminal is separated from the access network and the terminal moves traffic according to the command/instruction only when the terminal is not separated from the access network. Accordingly, since the terminal and the access network can be prevented from being unnecessarily separated from each other, continuity and persistence of a service are corrected.

DESCRIPTION OF EXEMPLARY EMBODIMENTS

Figure 1:
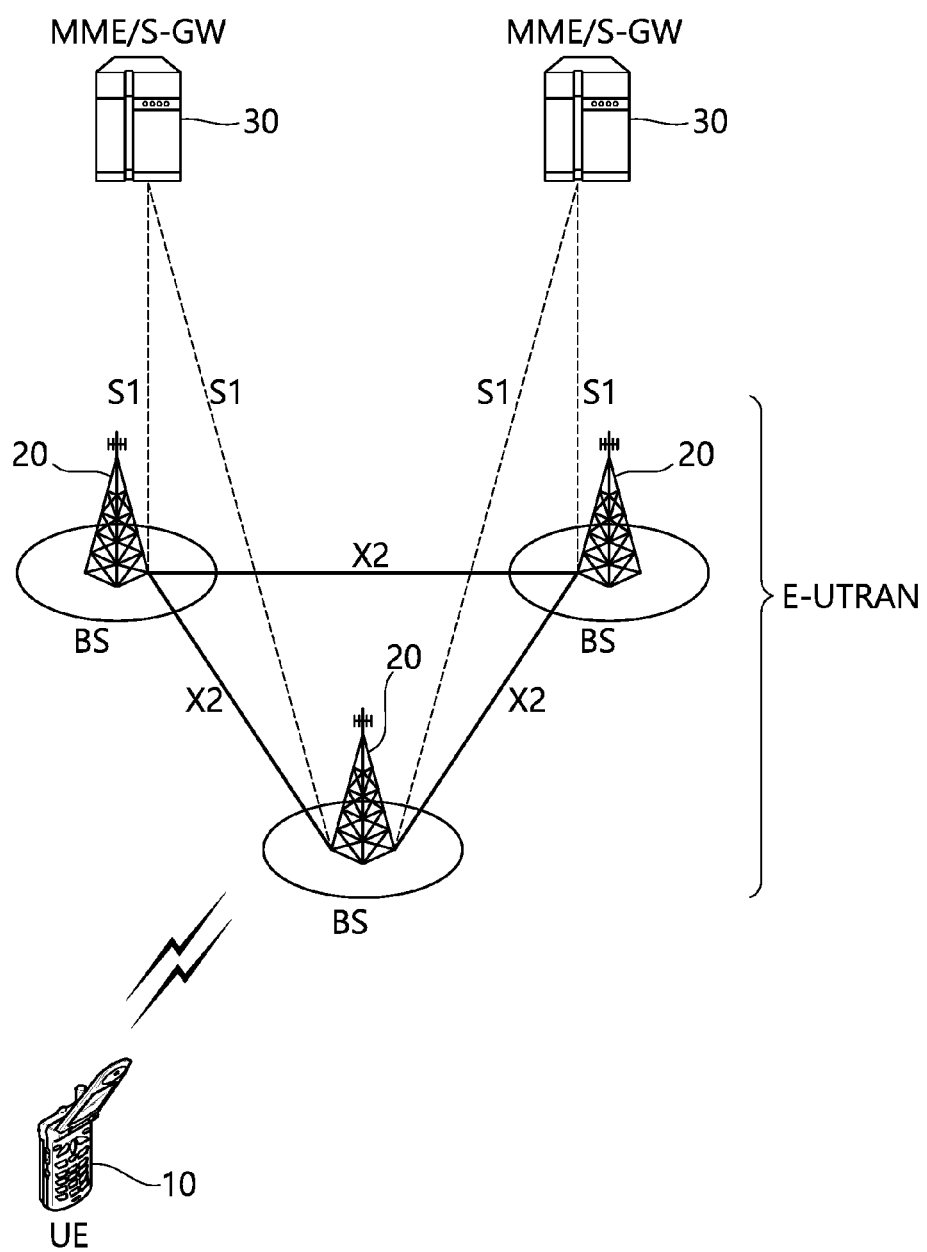
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
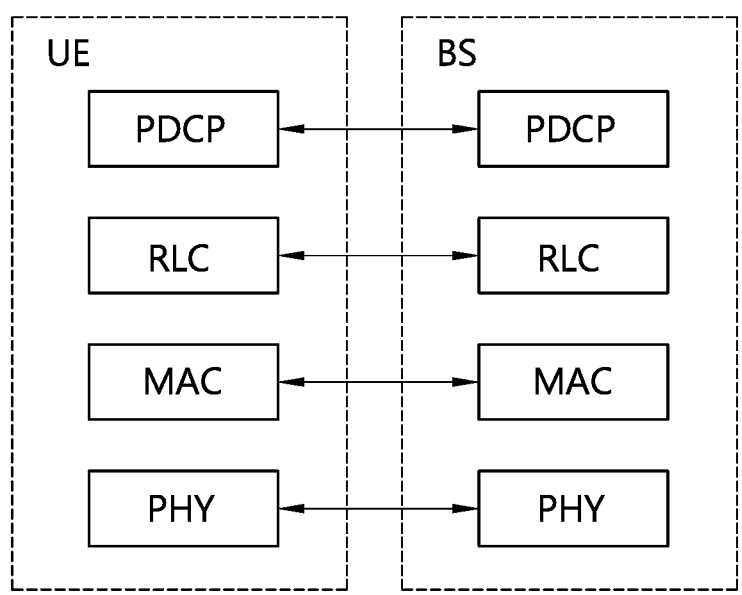
FIG. 2 is a diagram showing a wireless protocol architecture for a user plane.
Figure 3:
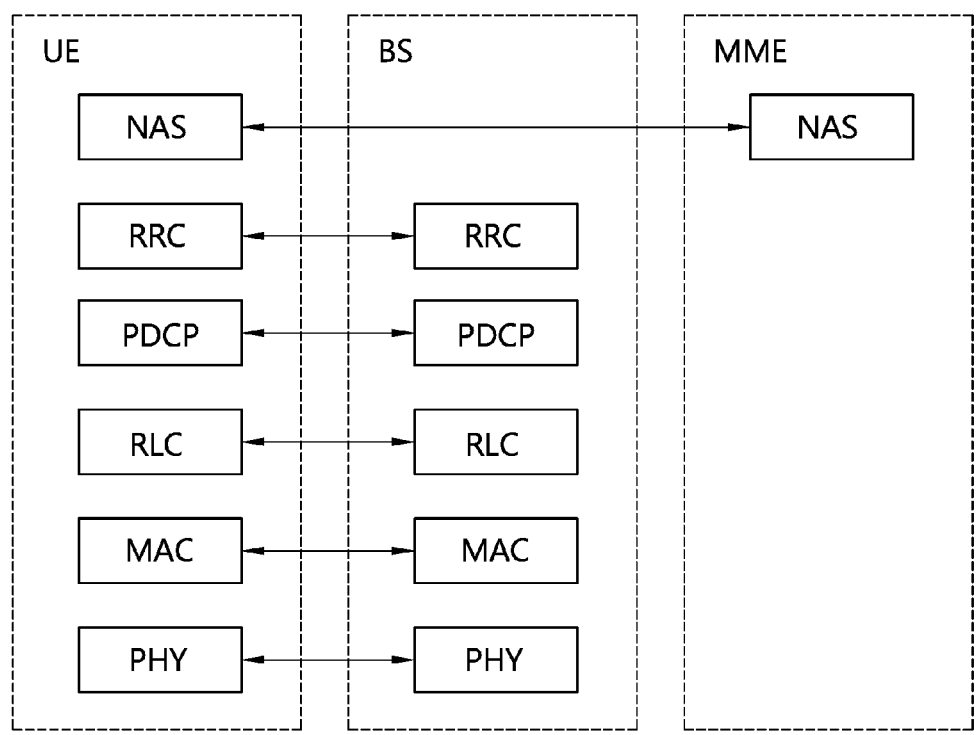
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As disclosed in 3GPP TS 36.211 V8.7.0, in 3GPP LTE, a physical channel may be divided into Physical Downlink Shared Channel (PDSCH) and Physical Uplink Shared Channel (PUSCH) which are data channels and Physical Downlink Control Channel (PDCCH), Physical Control Format Indicator Channel (PCFICH), Physical Hybrid-ARQ Indicator Channel (PHICH) and Physical Uplink Control Channel (PUCCH) which are control channels.

The PCFICH transmitted in a first OFDM symbol of a subframe transports a control format indicator (CFI) regarding the number (that is, the size of a control region) of OFDM symbols used for transmitting the control channels in the subframe. The terminal first receives the CFI on the PCFICH and thereafter, monitors the PDCCH.

The PDCCH as a downlink control channel is also referred to as a scheduling channel in terms of transporting scheduling information. Control information transmitted through the PDCCH is referred to as downlink control information (DCI). The DCI may include resource allocation (this is also referred to as a downlink (DL) grant) of the PDSCH, resource allocation (this is also referred to as an uplink (UL) grant) of the PUSCH, a set of transmission power control commands for individual UEs in a predetermined UE group, and/activation of voice over Internet protocol (VoIP).

In the 3GPP LTE, blind decoding is used for detecting the PDCCH. The blind decoding is a scheme that demasks cyclic redundancy check (CRC) of the received PDCCH (this is referred to as a candidate PDCCH) with a desired identifier and checks a CRC error to verify whether the corresponding PDCCH is the control channel thereof.

A base station determines a PDCCH format according to the DCI which the base station is to transmit to the terminal and thereafter, attaches the CRC to the DCI and demasks the CRC with a unique identifier (this is referred to as a radio network temporary identifier (RNTI) according to an owner or a purpose of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIB s.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling.

When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG 3) A barred cell: this cell is a cell that broadcasts information indicative of a barred cell through system information.

4) A reserved cell: this cell is a cell that broadcasts information indicative of a reserved cell through system information.

Figure 4:
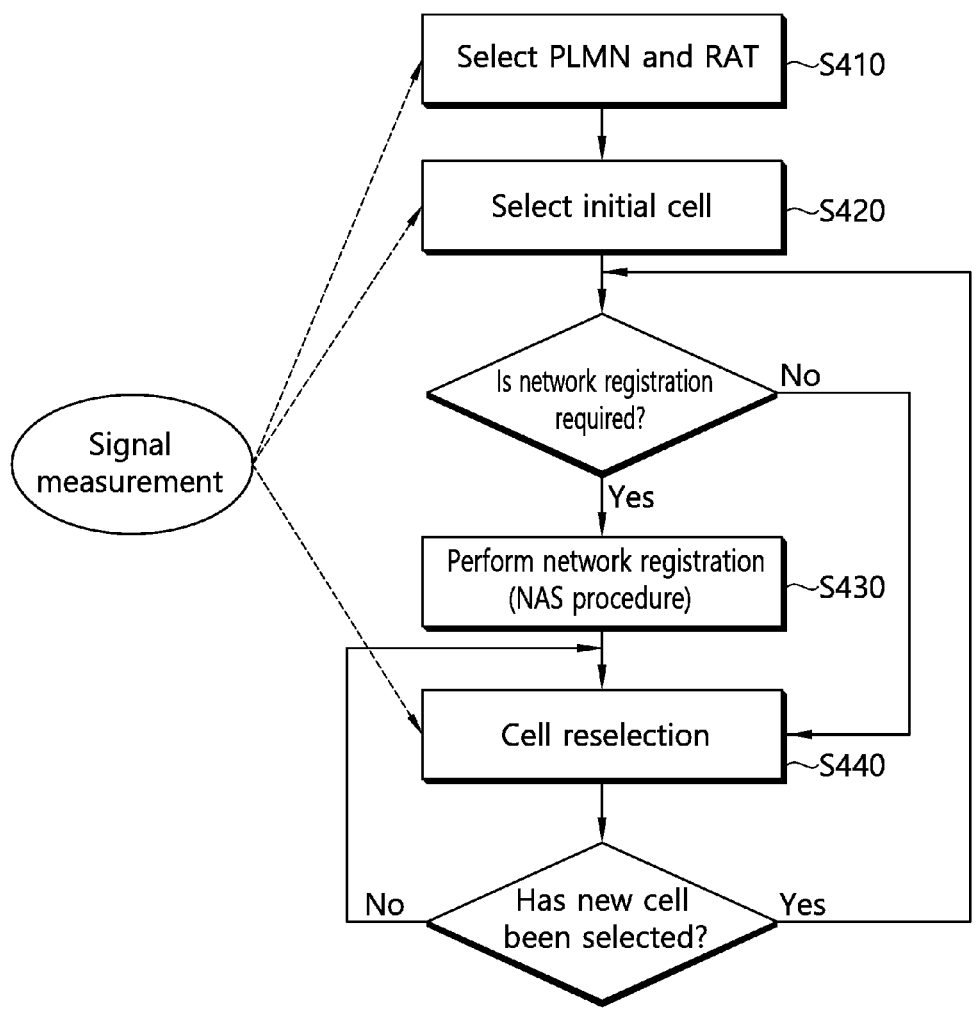
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
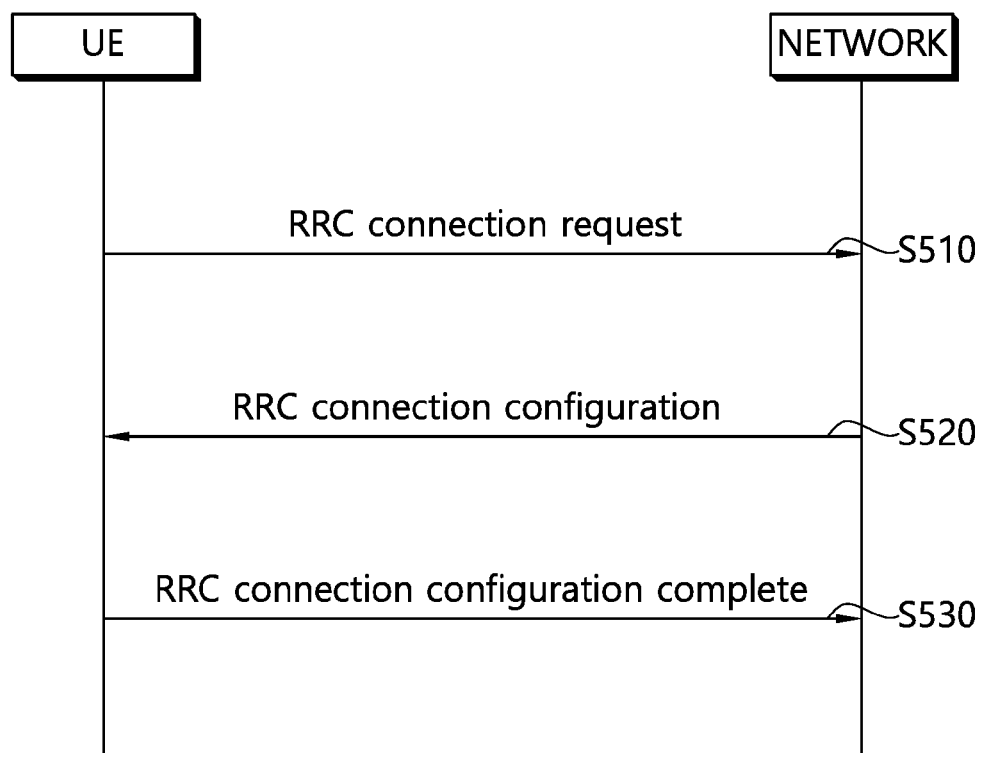
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
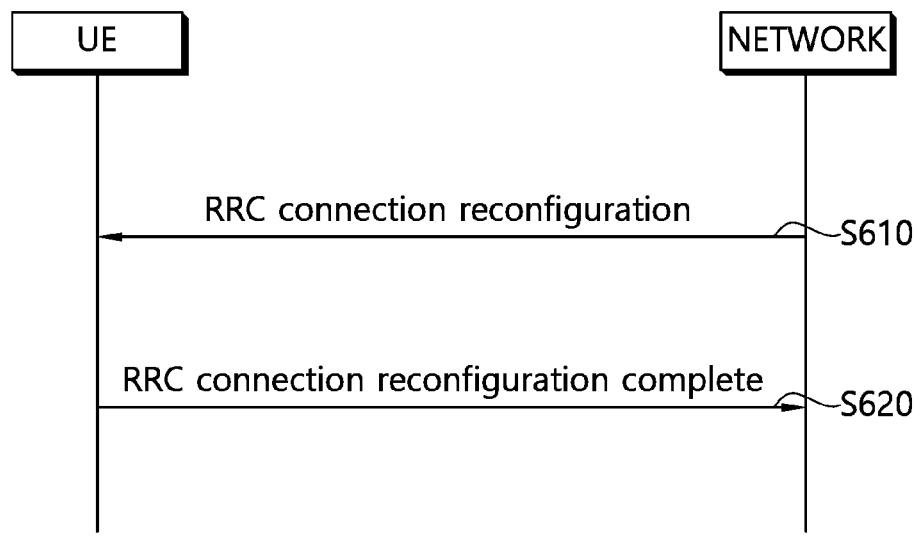
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

A cell selection criterion may be defined as in Equation 1 below.

$$Srxlev>0 \text{ AND } Squal>0,\qquad [\text{Equation 1}]$$

where:
$Srxlev = Q_{rxlevmeas} - (Q_{rxlevmin} + Q_{rxlevminoffset}) - P_{compensation}$;
$Squal = Q_{qualmeas} - (Q_{qualmin} + Q_{qualminoffset})$ In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection process, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to give the priority of a cell is defined as in Equation 2.

$$R_s = Q_{meas,s} + Q_{hyst} R_n = Q_{meas,n} - Q_{offset}$$ [Equation 2]

In Equation 2, $R_s$ is the ranking criterion of a serving cell on which UE now camps, $R_n$ is the ranking criterion of a neighboring cell, $Q_{meas,s}$ is the quality value of the serving cell measured by the UE, $Q_{meas,n}$ is the quality value of the neighboring cell measured by the UE, $Q_{hyst}$ is a hysteresis value for ranking, and $Q_{offset}$ is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

According to cell reselection evaluation, the terminal may determine that a cell reselection criterion is satisfied when the cell reselection criterion is satisfied for a specific time in performing cell reselection and may cell-move to a selected target cell. Herein, the specific time as a Treselection parameter may be given from the network. Treselection may specify a cell reselection timer value and be defined with respect to each frequency of E-UTRAN and another RAT.

Hereinafter, cell reselection information used for the cell reselection by the terminal will be described.

The cell reselection information may be transmitted while being included in system information broadcasted from the network and provided to the terminal in a format of a cell reselection parameter. The cell reselection parameter provided to the terminal may include types given below.

Cell reselection priority (cellReselectionPriority): The cellReselectionPriority parameter specifies priorities for a frequency of E-UTRAN, a frequency of UTRAN, a group of GERAN frequencies, a band class of CDMA2000 HRPD, or a band class of CDMA2000 1×RTT.

$Qoffset_{s,n}$: specifies an offset value between two cells.

$Qoffset_{frequency}$: specifies a frequency specific offset for the E-UTRAN frequency having the same priority.

$Q_{hyst}$: specifies a hysteresis value for a rank index.

$Q_{qualmin}$: specifies a minimally required quality level and is specified by the unit of dB.

$Q_{rxlevmin}$: specifies a minimally required Rx level and is specified by the unit of dB.

$Treselection_{EUTRA}$: specifies a cell reselection timer value for E-UTRAN and may be set with respect to each frequency of E-UTRAN.

$Treselection_{UTRAN}$: specifies the cell reselection timer value for UTRAN.

$Treselection_{GERA}$: specifies the cell reselection timer value for GERAN.

$Treselection_{CDMA\_HRPD}$: specifies the cell reselection timer value for CDMA HRPD.

$Treselection_{CDMA\_1\times RTT}$: specifies the cell reselection timer value for CDMA 1×RTT.

$Thresh_{x,\ HighP}$: specifies an Srxlev threshold used by the terminal during cell reselection with a RAT/frequency having a higher priority than a serving frequency by the unit of dB. The specific threshold may be individually set with respect to the frequency of each of E-UTRAN and UTRAN, each group of the GERAN frequency, each band class of CDMA2000 HRPD, and each band class CDMA2000 1×RTT.

$Thresh_{x,\ highQ}$: specifies an Squal threshold used by the terminal during cell reselection with the RAT/frequency having the higher priority than the serving frequency by the unit of dB. The specific threshold may be individually set with respect to the frequency of each of E-UTRAN and UTRAN FDD.

$Thresh_{x,\ LowP}$: specifies the Srxlev threshold used by the terminal during cell reselection with a RAT/frequency having a lower priority than the serving frequency by the unit of dB. The specific threshold may be individually set with respect to the frequency of each of E-UTRAN and UTRAN, each group of the GERAN frequency, each band class of CDMA2000 HRPD, and each band class CDMA2000 1×RTT.

$Thresh_{x,\ LowQ}$: specifies the Squal threshold used by the terminal during cell reselection with a RAT/frequency having the lower priority than the serving frequency by the unit of dB. The specific threshold may be individually set with respect to the frequency of each of E-UTRAN and UTRAN FDD.

$Thresh_{Serving,\ LowP}$: specifies the Srxlev threshold used by the terminal on a serving cell during cell reselection with the RAT/frequency having the lower priority by the unit of dB.

$Thresh_{Serving,\ LowQ}$: specifies the Squal threshold used by the terminal on the serving cell during cell reselection with the RAT/frequency having the lower priority by the unit of dB.

$S_{IntraSerachP}$: specifies the Srxlev threshold for intra-frequency measurement by the unit of dB.

$S_{IntraSerachQ}$: specifies the Squal threshold for the intra-frequency measurement by the unit of dB.

$S_{nonIntraSerachP}$: specifies the Srxlev threshold for E-UTRAN inter-frequency and inter-RAT measurement by the unit of dB.

$S_{nonIntraSerachQ}$: specifies the Squal threshold for the E-UTRAN inter-frequency and inter-RAT measurement by the unit of dB.

Meanwhile, the cell reselection information may be provided to the terminal while being included in an RRC connection release message which is an RRC message transmitted for RRC connection release between the network and the terminal. For example, the RRC connection release message may include a subcarrier frequency list and a cell reselection priority of E-UTRAN, a subcarrier frequency list and a cell reselection priority of UTRA-FDD, a subcarrier frequency list and a cell reselection priority of UTRA-TDD, a subcarrier frequency list and a cell reselection priority of GERAN, a band class list and a cell reselection priority of CDMA2000 HRPD, a band class list and a cell reselection priority of CDMA2000 1×RTT, and the like.

Hereinafter, radio link monitoring (RLM) will be described.

UE monitors downlink quality on the basis of a cell-specific reference signal in order to detect downlink radio link quality of a PCell. The UE estimates the downlink radio link quality and compares the estimated downlink radio link quality with thresholds Qout and Qin in order to monitor the downlink radio link quality of the Pcell. The threshold Qout is defined as a level of the downlink radio link quality which may not be stably received, and corresponds to a block error rate of 10% of hypothetical PDCCH transmission by considering a PDFICH error. The threshold Qin is defined a level of the downlink radio link quality which may be more stably received than the level of Qout and corresponds to a block error rate of 2% of the hypothetical PDCCH transmission by considering the PDFICH error.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
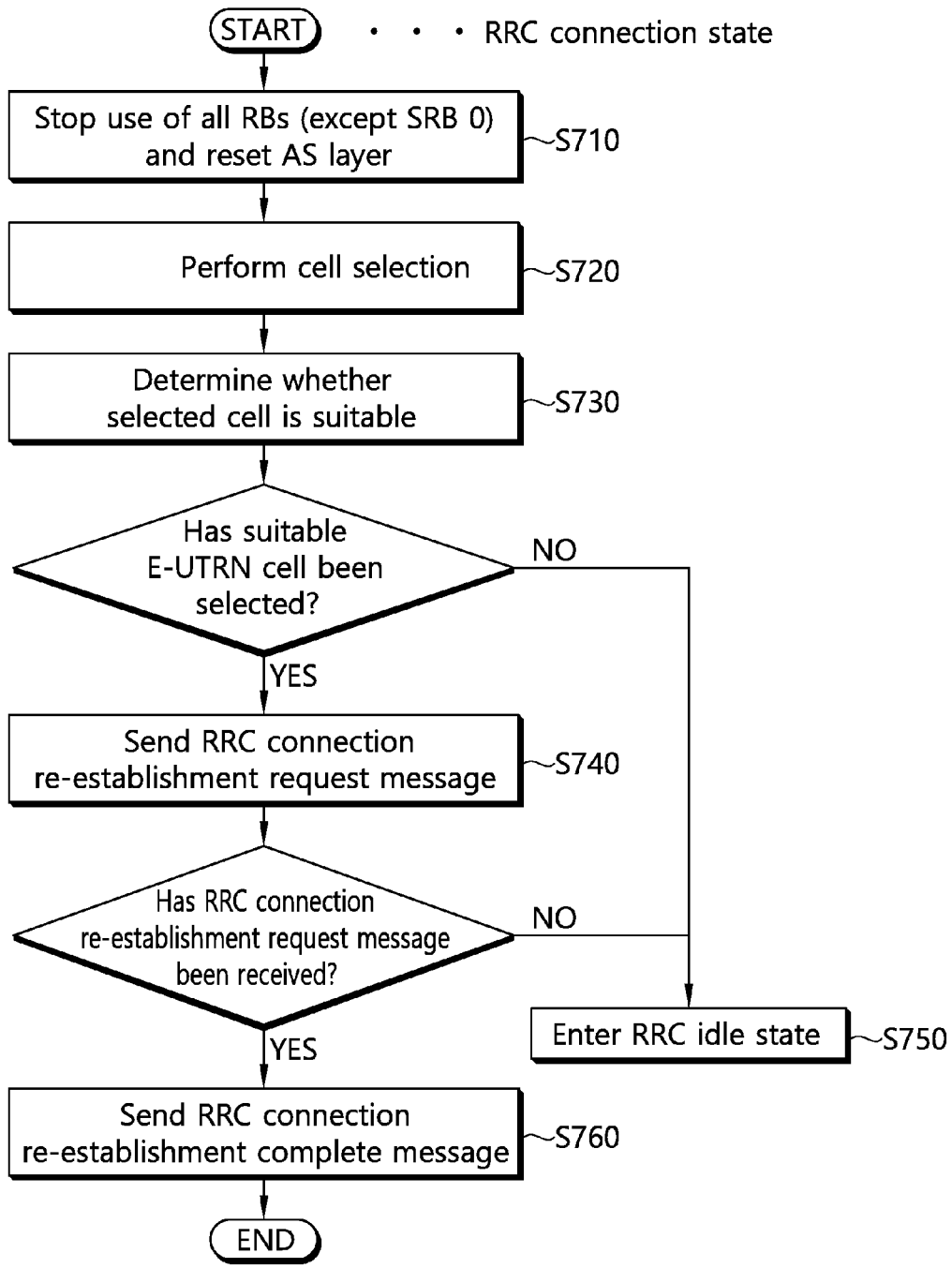
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, interworking between a 3GPP access network and another access network will be described.

In 3GPP, access network discovery and selection functions (ANDSF) for discovering and selecting an access network which is accessible while introducing interwoking with non-3GPP access network (e.g. WLAN) from Rel-8 was standardized. The ANDSF transfers discovery information (e.g. WLAN and WiMAX position information) of an access network which is accessible in a position of the UE, inter-system mobility policies (ISMP) capable of reflecting policies of a provider, an inter-system routing policy (ISRP), and the UE may determine which traffic is transmitted via any access network on the basis of the information. The ISMP may include a network selection rule for selecting one active access network connection (for example, WLAN or 3GPP) by the UE. The ISRP may include a network selection rule for selecting one or more potentially active access network connections (for example, both WLAN and 3GPP) by the UE. In the ISRP, multiple access PDN connectivity (MAPCON), IP flow mobility (IFOM), and non-seamless WLAN offloading are included. For dynamic provision between the ANDSF and the UE, open mobile alliance device management (OMA DM) and the like are used.

The MAPCON standardizes a technique of setting and maintaining the multiple PDN connectivity at the same time via the 3GPP access network and the non-3GPP access network, and performing seamless traffic offloading of the entire active PDN connection unit. To this end, an ANDSF server provides access point name (APN) information to perform offloading, a routing rule between the access networks, a time of day to which the offloading method is applied, and validity area information to perform the offloading, and the like. The offloading may be defined as moving a load/traffic to a second access network from the first access network.

The IFOM supports mobility of an IP flow unit which is more flexible and subdivided than the MAPCON and seamless offloading. Unlike the MAPCON, even if the UE is connected to the packet data network by using the same APN, the UE is accessible through different access networks and a unit of mobility and offloading moves to a specific service IP traffic flow unit other than the PDN. As a result, the technical feature of the IFOM has flexibility of the service provision. To this end, the ANDSF server provides IP flow information to perform offloading, a routing rule between the access networks, a time of day to which the offloading method is applied, and validity area information to perform the offloading, and the like.

The non-seamless WLAN offloading means a technique of converting a path of any specific IP traffic to WLAN and completely offloading the traffic so as not to pass though the EPC. The reason is that anchoring to P-GW is not performed for supporting mobility, and the offloaded IP traffic may not seamlessly move to the 3GPP access network again. To this end, the ANDSF server provides similar information to information provided to the UE for performing the IFOM.

Figure 8:
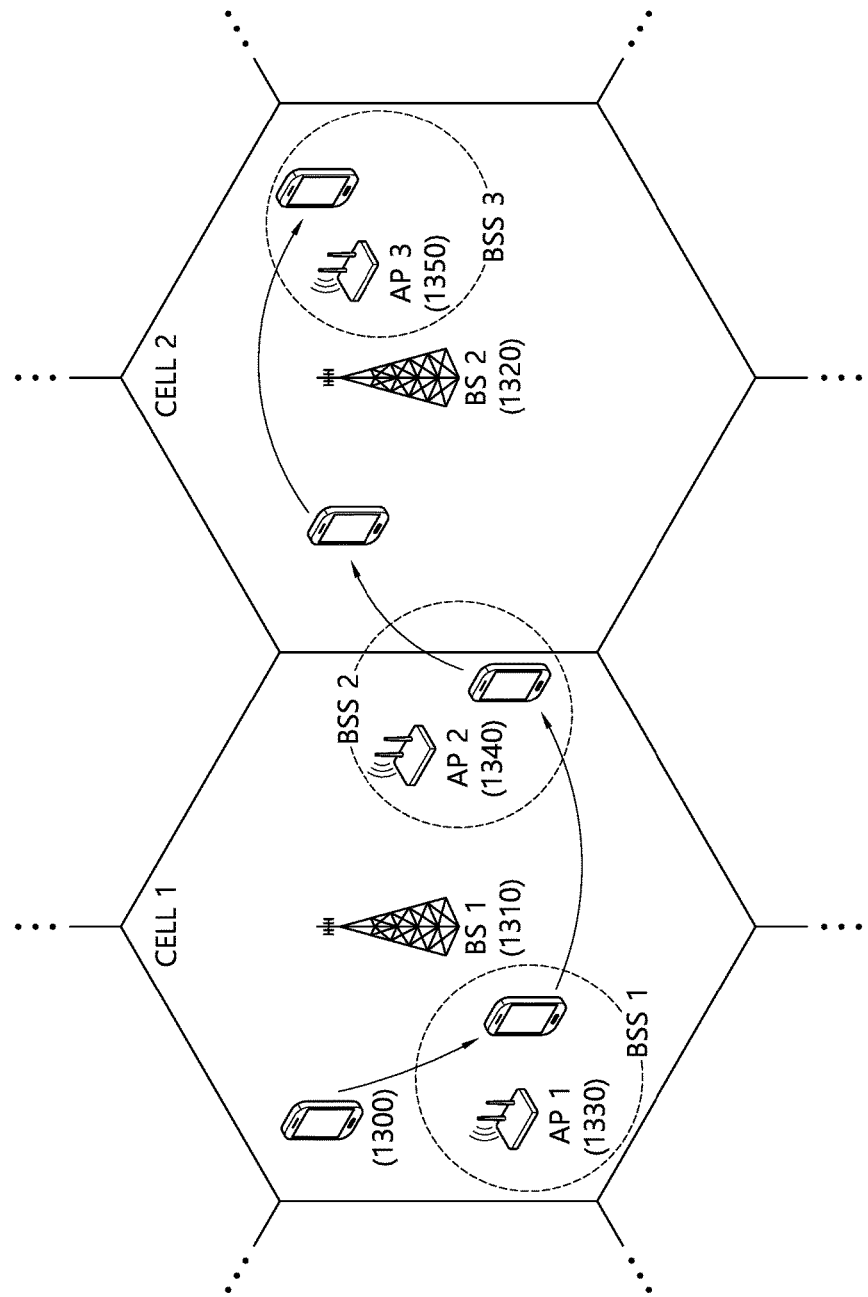
FIG. 8 is a diagram illustrating an example of an environment in which the 3GPP access network and the WLAN access network coexist.

FIG. 8 is a diagram illustrating an example of an environment in which the 3GPP access network and the WLAN access network coexist.

Referring to FIG. 8, cell 1 based on base station 1 1310 and cell 2 based on base station 2 1320 are deployed as the 3GPP access network. Further, as the WLAN access network, basic service set 1 based on access point 1 1330 positioned in the cell 1 and BSS 2 based on AP2 1340 are deployed, and BSS 3 based on AP3 1350 existing in the cell 2 is deployed. The cell coverage is illustrated by a solid line and the coverage of the BSS is illustrated by a dotted line.

It is assumed that UE 1300 is set to perform communication through at least one of the 3GPP access network and the WLAN access network. In this case, the UE 1300 may be called a station.

First, the UE 1300 may perform traffic processing through the 3GPP access network by establishing connection with the BS 1 1310 in the cell 1.

It is assumed that the UE 1300 enters into the coverage of the BSS 1 while moving in the coverage of the cell 1. In this case, if the traffic processing between the UE 1300 and the BS 1 1310 is not smooth or the traffic processing is more smooth with the AP 1 1330, it is efficient that the traffic moves from the 3GPP access network to the WLAN access network.

Hereinafter, a method of steering the traffic in the 3GPP access network will be described.

Hereinafter, it is assumed that the 3GPP access network is UTRAN/E-UTRAN and the non-3GPP access network is the WLAN access network. In addition, for convenience of description, the 3GPP access network may be called a first network or RAN, and the non-3GPP access network may be called a second network or WLAN.

Figure 9:
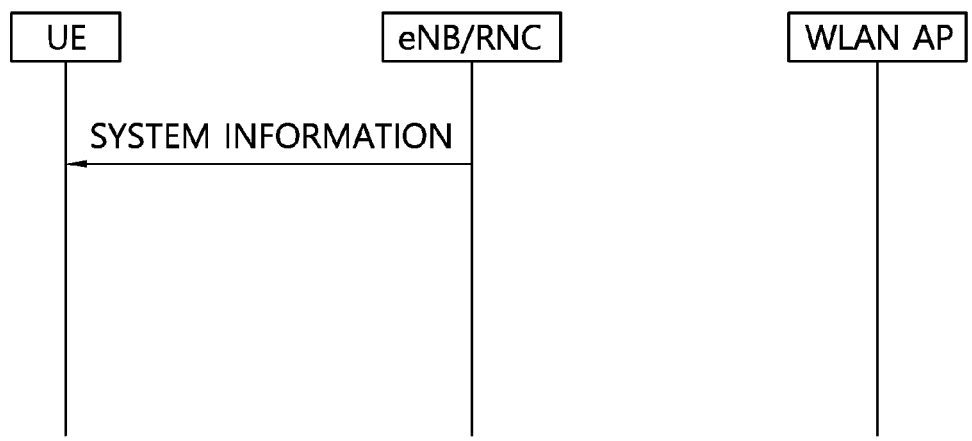
FIG. 9 illustrates an example of the method of steering the traffic.

FIG. 9 illustrates an example of the method of steering the traffic.

Referring to FIG. 9, the eNB/RNC may be a base station of the first network RAN and the WLAN AP may be a base station of the second network. The eNB/RNC may provide network assistance information to the UE through the system information. The network assistance information may be broadcasted or provided through a dedicated signal.

The network assistance information may include at least one of the following parameters.

TABLE 2

| Parameter | Description |
| --- | --- |
| Load Information | Directly/indirectly indicate UMTS/LTE load (for example, display percentage of UMTS/LTE load or display offload percentage) |
| Resource Allocation | UE allocate maximum resources which may be received from UMTS/LTE |
| WLAN Thresholds | Threshold of WLAN reception signal strength indicator (RSSI), WLAN BSS load threshold, and WLAN WAN metric threshold |
| RAN Thresholds | RSRP/RSCP thresholds |

The UE may be move, that is, offload the load from the first network to the second network on the basis of the parameters included in the network assistance information.

For example, if reference signal received power (RSRP) of the first network is smaller than a threshold s, the load/traffic of the first network is larger than a threshold x, a received signal strength indicator (RSSI) of the second network is larger than a threshold r, and the load/traffic of the second network is smaller than a threshold y, the load may be moved to the second network.

Further, if the RSRP of the first network is larger than a threshold s', the load/traffic of the first network is smaller than a threshold x', and the RSSI of the second network is smaller than a threshold r', and the load/traffic of the second network is larger than a threshold y', the load may be moved to the first network. The thresholds s, s', x, and x' are RAN thresholds of Table 2 and r, r', y, and y' are the WRAN thresholds.

Figure 10:
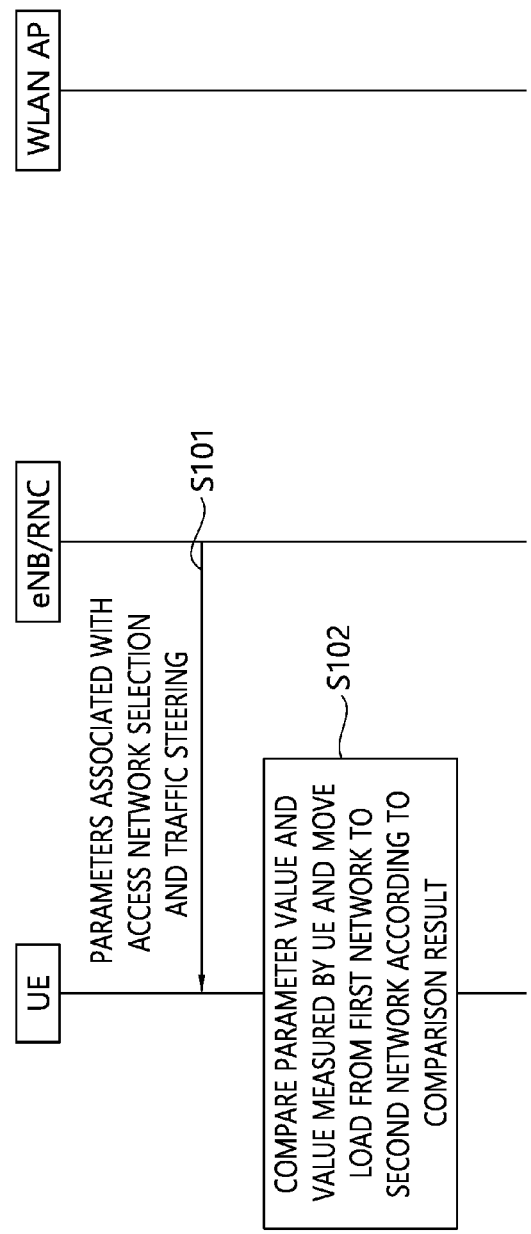
FIG. 10 illustrates another example of the method of steering the traffic.

FIG. 10 illustrates another example of the method of steering the traffic.

Referring to FIG. 10, the eNB/RNC may be a base station of the first network RAN and the WLAN AP may be a base station of the second network. The eNB/RNC transmits parameters related with the access network selection and the traffic steering to the UE, that is, parameters for evaluating the traffic steering according to an RAN rule (S101). Herein, the RAN rule means a rule for an interworking policy which reflects measurement parameters including the load of the 3GPP access network and/or the WLAN access network, the signal quality, and the like. The parameters may be broadcasted or provided through a dedicated signal.

The RAN rule and the parameters for the RAN rule may be set as follows.

1) The RAN rule may indicate whether the traffic steering to the WLAN is allowed.

2) The RAN rule may indicate a traffic steering evaluation condition as a condition in which the traffic steering from the 3GPP access network to the WLAN access network is allowed or required. The condition according to the RAN rule may involve evaluation of measured results for the LTE cell. Further, the condition according to the RAN rule may involve evaluation of measured results for the WLAN. The evaluation may be comparing the measured result with the RAN rule parameters (e.g. measured thresholds and the like) which are indicated in the traffic steering information. An example of the traffic steering evaluation condition considered by the UE is illustrated as follows.

(I) Traffic steering condition to WLAN access network

RSRP measured value measured_RSRP<low RSRP threshold Threshold_RSRP_low

3GPP load measured value measured_3 GPPLoad>high 3GPP load threshold Threshold_3 GPPLoad_High WLAN load measured value measured_WLANLoad<low WLAN load threshold Threshold_WLANLoad_low WLAN signal intensity measured value measured_WLANsignal>high WLAN signal intensity threshold Threshold_WLANsignal_high (II) Traffic steering condition to 3GPP access network RSRP measured value measured_RSRP>high RSRP threshold Threshold_RSRP_high 3GPP load measured value measured_3 GPPLoad<low 3GPP load threshold Threshold_3 GPPLoad_High WLAN load measured value measured_WLANLoad>high WLAN load threshold Threshold_WLANLoad_high WLAN signal intensity measured value measured_WLANsignal<low WLAN signal intensity threshold Threshold_WLANsignal_low Meanwhile, the evaluation condition may be set while one or more conditions are coupled with each other by and/or. For example, the traffic steering evaluation condition implemented when one or more conditions are coupled with each other may be implemented as follows.

Traffic steering evaluation condition for traffic steering to WLAN: (measured_RSRP<Threshold_RSRP_low) and (measured_WLANLoad<Threshold_WLANLoad_low) and (measured_WLANsignal>Threshold_WLANsignal_high)

Traffic steering evaluation condition for traffic steering to 3GPP: (measured_RSRP>Threshold_RSRP_low) or (measured_WLANLoad>Threshold_WLANLoad_high) or (measured_WLANsignal<Threshold_WLANsignal_low)

3) The RAN rule may indicate a condition in which the traffic steering from the WLAN access network to the 3GPP access network which is performed by the UE is allowed or required.

4) The RAN rule may indicate the target WLAN access network in which the traffic steering from the 3GPP access network which is performed by the UE is allowed or required.

5) The RAN rule may indicate a traffic type in which routing to the WLAN access network is allowed. Alternatively, the RAN rule may indicate one or more traffic in which the routing to the WLAN access network is allowed, that is, which may be serviced by only the 3GPP access network.

The UE may move the load from the first network to the second network according to the result by comparing the aforementioned parameter values with the values measured by the UE (S102).

Figure 11:
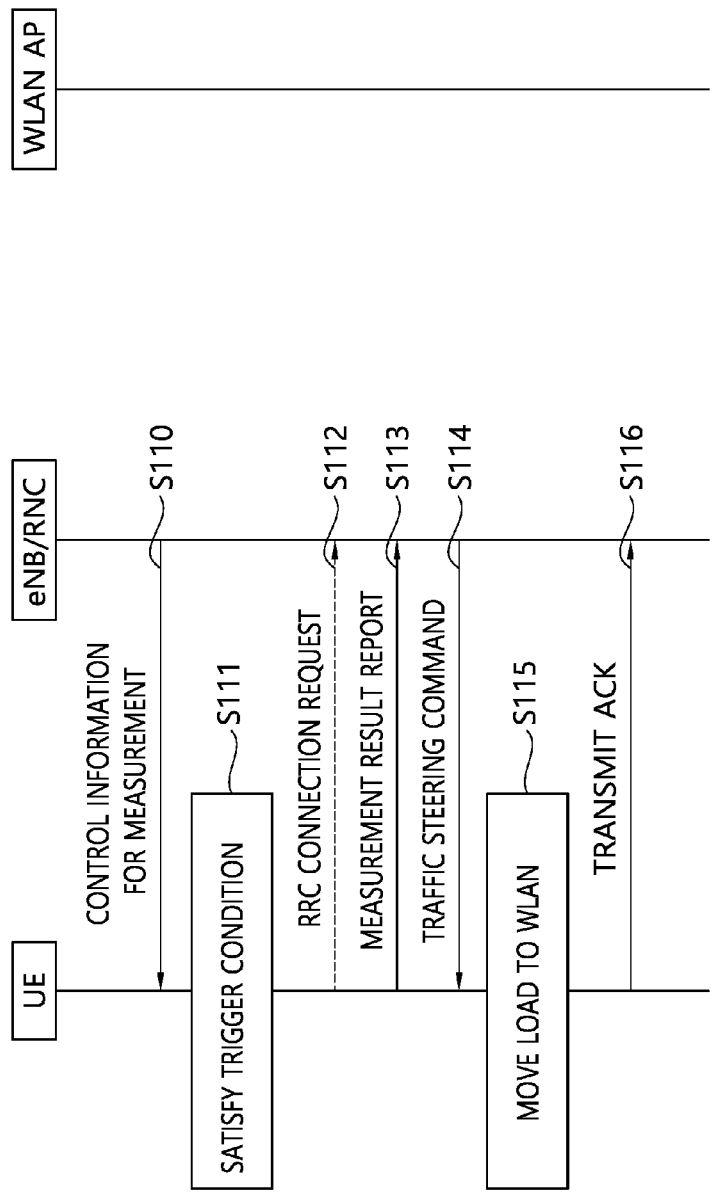
FIG. 11 illustrates yet another example of the method of steering the traffic.

FIG. 11 illustrates yet another example of the method of steering the traffic.

Referring to FIG. 11, the eNB/RNC may be a base station of the first network RAN and the WLAN AP may be a base station of the second network. The eNB/RNC may set the measurement of a target WLAN by transmitting control information including an ID of the target WLAN, a measurement report rule such as a trigger condition for a report of the measurement report to the UE (S110). That is, the first network may transmit the control information for measuring the second network.

The following Table illustrates an example a trigger condition for the report of the measurement result included in the control information.

TABLE 3

| Event | Description |
|---|---|
| W1 | WLAN is better than threshold triggering of moving traffic to WLAN |
| W2 | WLAN is worse than threshold triggering of moving traffic to WLAN |
| W3 | Radio quality of 3GPP cell is worse than threshold and radio quality of WLAN is better than threshold (this is condition of moving traffic to WLAN) |
| W4 | Radio quality of WLAN is worse than threshold and radio quality of 3GPP cell is better than threshold (this is condition of moving traffic to 3GPP cell in WLAN) |

The ID of the target WLAN included in the control information may be constituted as the following Table.

TABLE 4

| Identifier | Description |
|---|---|
| BSSID | Basic service set identifier. BSSID may be MAC address of radio AP |
| SSID | Service set identifier |
| HESSID | Homogeneous extended service set identifier |
| Domain Name List | List including one or more domain names of entity operating WLAN access network |
| Operating class, channel number | Indicate target WLAN frequency |

When the UE satisfies the trigger condition (S111), the UE transmits the RRC connection request (S112), and transmits the measured result for the target WLAN to the RAN (S113). That is, the UE transmits the measured result for the second network.

The measured result may include at least one of the following contents.

TABLE 5

| Identifier | Description |
| --- | --- |
| RCPI | Received channel power indicator<br>Reception RF power in selected channel of received frame is measured in range of - 110 to 0 dBm. |
| RNSI | Received signal to noise indicator<br>Illustrate signal to noise and interference ration of received WLAN frame |
| BSS Load | Include information for traffic level in BSS |
| WAN metrics | Estimate whether capacity of WLAN AP is filled, link state, downlink/uplink speed, and the like |

The first network, that is, RAN transmits a trigger steering command on the basis of the received measured result and load. The trigger steering command may indicate a traffic to move to the WLAN (alternatively, from the WLAN) through at least one of IDs included in the following Table.

TABLE 6

| Identifier | Description |
| --- | --- |
| DRB/RB-ID | ID of radio bearer |
| QCI | QoS class ID |

The UE moves the load to the WLAN according to the traffic steering command (S115), and transmits an ACK to the RAN (S116). The ACK is an acknowledge notifying that the traffic steering command is successfully received.

Meanwhile, in methods described in FIGS. 9 to 11, the following problems may occur. That is, while the first network does not accurately know the traffic of the UE, the first network may command the traffic to move to the second network to the UE. As the result of moving the traffic by the command, the traffic transceived between the first network and the UE may not be present. As a result, a traffic transmission path connected with the first network (e.g. a traffic transmission path from the first network connected with bearer/IP flow/APN) may be deleted by the first network or the UE. When any traffic transmission path (e.g. a traffic transmission path from the first network connected with bearer/IP flow/APN) does not remain in the first network, it may be determined that the UE is separated from the first network. Then, a problem that the service received from the first network by the UE is stopped or interrupted may occur.

Hereinafter, a method of solving the problem will be described.

Figure 12:
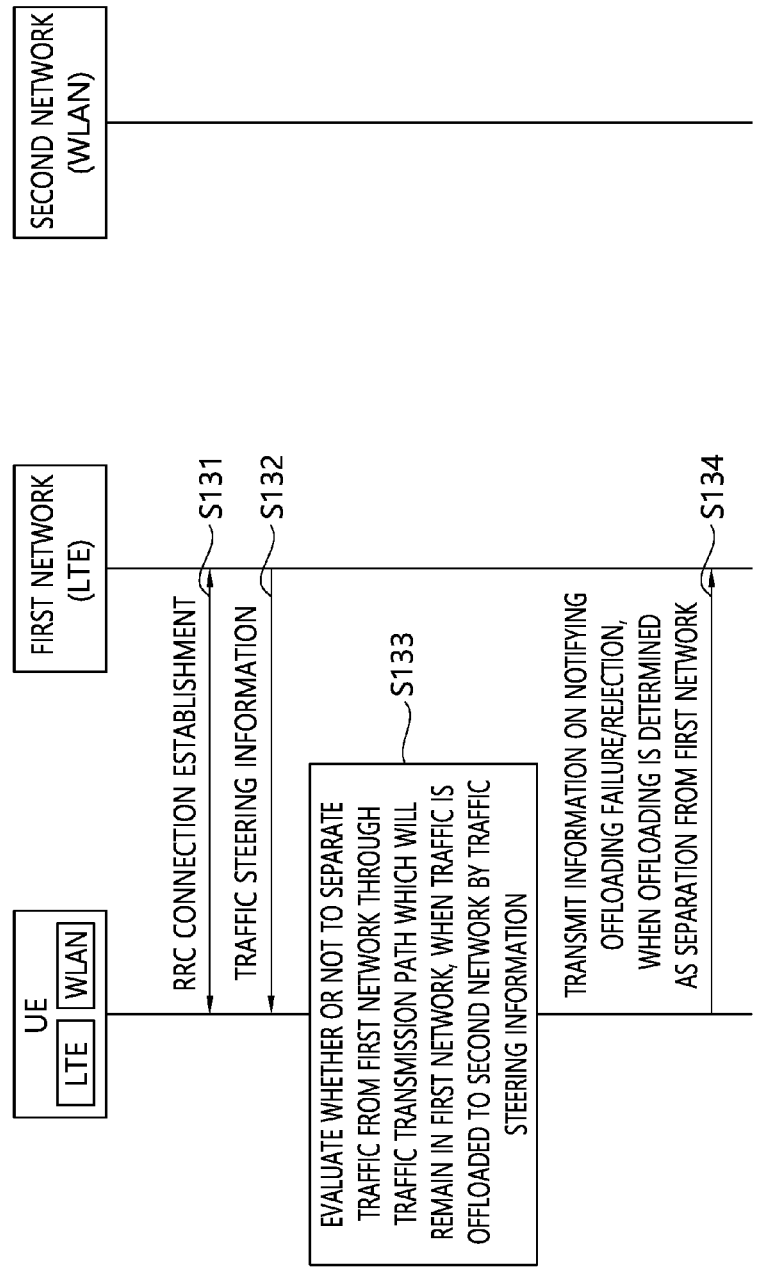
FIG. 12 illustrates a method of steering a traffic according to an embodiment of the present invention.

FIG. 12 illustrates a method of steering a traffic according to an embodiment of the present invention.

Referring to FIG. 12, the UE and the first network are in an the RRC connection establishment state (S131). The first network may signal traffic steering information to the UE (S132).

Herein, the traffic steering information may information indicating to the UE that a specific traffic is processed through the second network (for example, the AP of the WLAN) other than the first network. That is, the traffic steering information may information indicating that the specific traffic moves from the first network to the second network.

In order for the UE to indicate the specific traffic to move to the second network, the traffic steering information may include at least one of an APN type (alternatively, an APN name), a radio bearer ID, a QoS class ID (QCI) value, an IP port, a domain name, and a service name.

The traffic steering information may be broadcasted or signaled through a dedicated signal.

The traffic steering information may be included in the aforementioned traffic steering command or the network assistance information.

When the traffic steering information is received, in the case where the UE offloads the specific traffic to the second network, the UE evaluates whether the UE is separated from the first network through the traffic transmission path (e.g. the traffic transmission path from the first network connected with bearer/IP flow/APN) remaining in the first network (S133). For example, whether the UE is separated from the first network may be evaluated through whether the traffic remaining in the first network or the traffic transmission path remains by the radio bearer unit. That is, when the specific traffic is offloaded to the second network, in the case where at least one of the traffic in the first network or the traffic transmission path, for example, the transmission path from connected to the radio bearer/IP flow/accessed APN remains even after offloading, the UE may evaluate that the UE is not separated from the first network. On the contrary, after offloading, when the transmission paths connected to the radio bearer/IP flow/accessed APN do not remain in the first network, the UE may evaluate that the UE is separated from the first network.

As the evaluated result, if it is determined that the traffic in the first network or the traffic transmission path does not remain and the UE is separated from the first network when performing offloading according to the traffic steering information, the UE notifies to the first network that the specific traffic is not offloaded to the second network and the offloading to the second network is failed in spite of the traffic steering information. Alternatively, it is notified to the first network that the offloading to the second network is rejected by the UE. In this case, the information notifying the failure or the information notifying the rejection may include the reason of the failure/rejection, for example, an indicator notifying that the UE may be separated from the first network when performing the offloading (S134).

Figure 13:
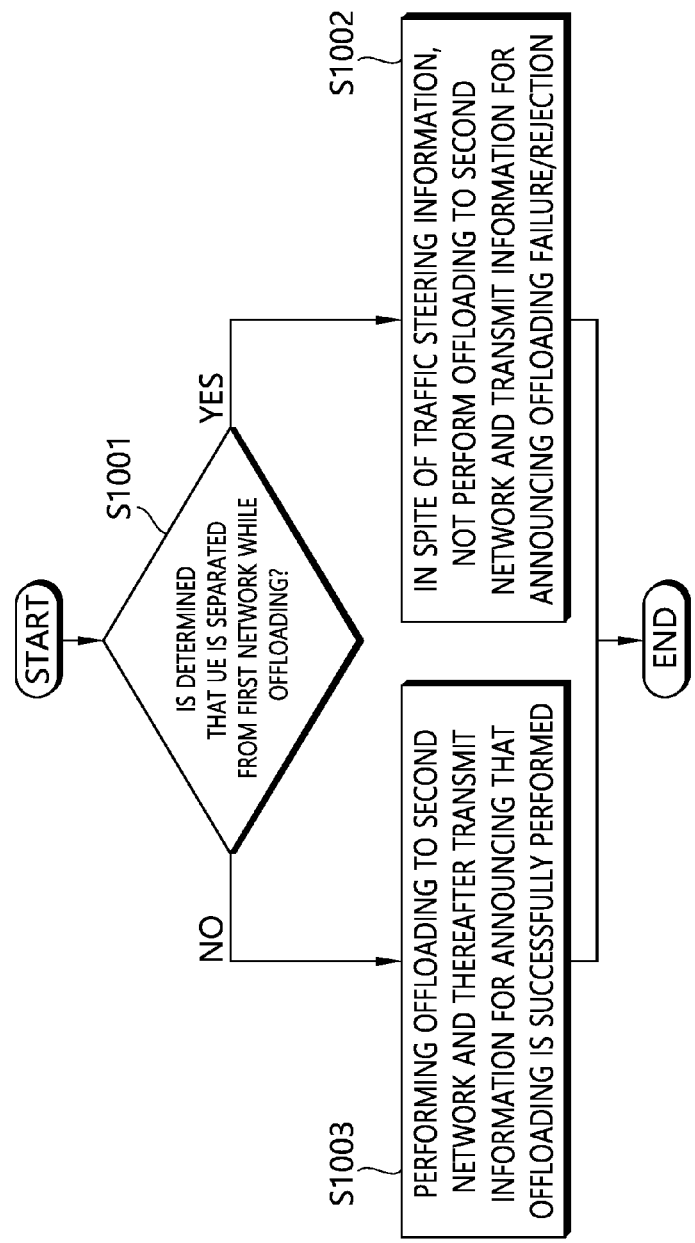
FIG. 13 exemplifies an operation of the UE after step S133 of FIG. 12.

FIG. 13 exemplifies an operation of the UE after step S133 of FIG. 12.

Referring to FIG. 13, when offloading to the second network by the traffic steering information, it is determined whether the UE is separated from the first network (S1001). When it is determined whether the UE is separated from the first network, the UE may not perform the offloading to the second network in spite of the traffic steering information and transmits to the first network information (a message) notifying that the offloading to the second network is rejected (S1002). The information may include an indicator notifying that the UE may be separated from the first network when performing the offloading.

On the contrary, when it is determined that the UE is not separated from the first network, the UE offloads the specific traffic indicated by the traffic steering information to the second network and may transmit information (message) notifying that the offloading to the first network is successfully performed (S1003).

The traffic of the UE may be specified through a hierarchical path including a packet data network (PDN), an access point name (APN), a bearer (abbreviated as a radio bearer or an EPS bearer), an IP flow, ad the like. Hereinafter, it is assumed that the traffic may be specified as the APN, the bearer, and the like.

Figure 14:
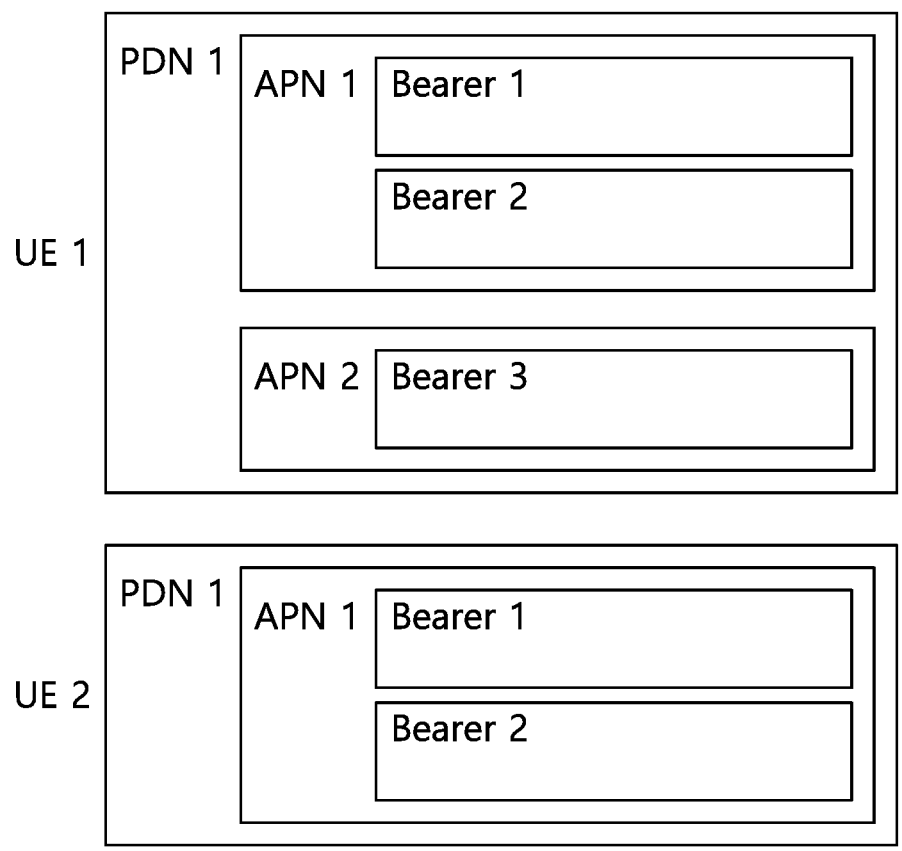
FIG. 14 exemplifies a traffic situation of the UEs accessing the first network and a method of steering the traffic according to the traffic situation.

FIG. 14 exemplifies a traffic situation of the UEs accessing the first network and a method of steering the traffic according to the traffic situation.

Referring to FIG. 14, UE 1 may have two APNs, that is, APN 1 and APN 2 and three bearers. In this case, the bearers 1 and 2 belong to the APN 1 and the bearer 3 may belong to the APN 2.

The UE 2 may have one APN, that is, APN 1 and two bearers.

In this case, the first network transmits the traffic steering information to the UEs 1 and 2, and the traffic steering information may indicate that the traffic via the APN 1 is offloaded to the second network WLAN. Herein, it is assumed that the second network satisfies other thresholds for offloading, for example, other conditions for offloading that a load of the second network is smaller than the threshold and the RSSI is higher than the threshold.

In the case of UE 1, even if all traffics via the APN 1 are offloaded to the second network, the bearer 3 of the APN 2 remains in the first network. Accordingly, the UE may not be separated from the first network even if performing the offloading. Therefore, the UE 1 may offload the bearers 1 and 2 corresponding to the APN 1 from the first network to the second network. The UE 1 may transmit information (a message) notifying that the offloading to the second network is successfully performed, to the first network after offloading.

On the contrary, in the cases of the UE 2, when the bearers 1 and 2 corresponding to the APN 1 are offloaded from the first network to the second network, any bearer does not remain at all in the first network, and if not, the first network may be separated from the UE 2.

Accordingly, the UE 2 does not perform the offloading to the second network in spite of the traffic steering information and may ignore the traffic steering information. The UE 2 may transmit information (a message) notifying that the offloading to the second network is rejected, to the first network. The information (message) may include an indicator notifying that the UE may be separated from the first network when performing the offloading.

Figure 15:
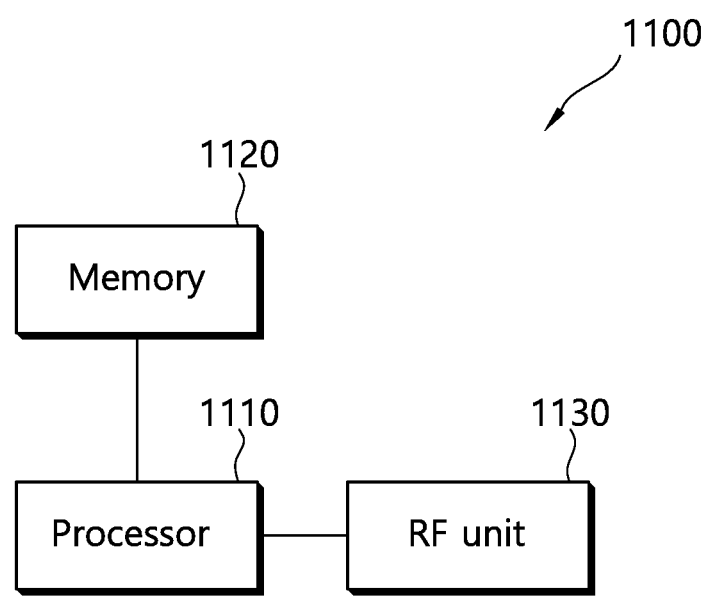
FIG. 15 is a block diagram illustrating a wireless apparatus in which an embodiment of the present invention may be implemented.

FIG. 15 is a block diagram illustrating a wireless apparatus in which an embodiment of the present invention may be implemented.

Referring to FIG. 15, a wireless apparatus 1100 includes a processor 1100, a memory 1120, and a radio frequency (RF) unit 1130.

The processor 1110 implements a function, a process, and/or a method which are proposed. The processor 1110 may be set to transmit and/or receive UE traffic steering preference information. The processor 111 receives the traffic steering information from the first network and moves the traffic from the first network to the second network on the basis of the traffic steering information only when a specific condition is satisfied. Herein, the specific condition may mean that the UE is not separated from the first network even if the traffic indicated by the traffic steering information moves to the second network. If the radio bearer indicated by the traffic steering information moves to the second network, when any radio bearer does not remain at all in the first network, the processor 1110 may ignore the traffic steering information.

The RF unit 1130 is connected with the processor 1110 to transmit and/or receive a radio signal. The RF unit 1130 may include one or more RF units for communicating the 3GPP-based access network and the non-3GPP-based access network.

The processor 1110 may include an application-specific integrated circuit (ASIC), other chipset, a logic circuit, and/or a data processing device. In FIG. 20, a single processor 1110 is illustrated to manage a control for all the RF units for each access network communication, but the wireless apparatus according to the present invention is not limited thereto. An embodiment in which each RF unit for each access network communication is functionally connected with each processor is possible.

The memory 1120 may include a read-only memory (ROM), a random access memory (RAM), a flash memory, a memory card, a storage medium, and/or other storage devices. The RF unit 1130 may include a baseband circuit for processing a radio signal. When the embodiment is implemented by software, the aforementioned technique may be implemented by the module (process, function, and the like) performing the aforementioned function. The module may be stored in the memory 1120 and executed by the processor 1110. The memory 1120 may be positioned inside or outside the processor 1110 and connected with the processor 1110 through various well-known means.

What is claimed is:

1. A method for traffic steering in a wireless communication system, the method performed by a user equipment (UE) and comprising:
   receiving, from a first network, traffic steering information;
   determining whether offloading from the first network to a second is performed based the traffic steering information; and
   transmitting, to the first network, offloading rejection information based on the determination,
   wherein when a plurality of access point names (APNs) connected with the first network are not assigned to the UE, the UE determines that offloading from the first network to the second is not performed and transmits the offloading rejection information to the first network,
   wherein the offloading rejection information indicates that offloading from the first network to the second is not performed, and
   wherein the offloading rejection information includes a rejection reason which indicates that the plurality of APNs connected with the first network are not assigned to the UE.

2. The method of claim 1, wherein the traffic steering information includes an identity (ID) of a radio bearer to be offloaded from the first network to the second network.

3. The method of claim 1, wherein:
   measurement control information is received from the first network, the second network is measured based on the measurement control information, and the measurement result is transmitted to the first network.

4. The method of claim 3, wherein the traffic steering information is generated based on the measurement result.

5. The method of claim 1, wherein the first network is a long term evolution (LTE) network and the second network is a wireless local area network (WLAN).

6. The method of claim 1, wherein each of the plurality of APNs includes at least one radio bearer.

7. A user equipment (UE) which operates in a wireless communication system, the UE comprising:

a radio frequency (RF) unit that transmits and receives a radio signal; and a processor, which operates in functional connection with the RF unit, that:

controls the RF unit to receive, from a first network, traffic steering information;

determines whether offloading from the first network to a second is performed based the traffic steering information; and controls the RF unit to transmit, to the first network, offloading rejection information based on the determination, wherein when a plurality of access point names (APNs) connected with the first network are not assigned to the UE, the UE determines that offloading from the first network to the second is not performed and transmits the offloading rejection information to the first network, wherein the offloading rejection information indicates that offloading from the first network to the second is not performed, and wherein the offloading rejection information includes a rejection reason which indicates that the plurality of APNs connected with the first network are not assigned to the UE.

* * * * *